United States Patent
Hamakubo et al.

(10) Patent No.: US 9,809,405 B2
(45) Date of Patent: Nov. 7, 2017

(54) PAPER FEEDING ROLLER

(71) Applicant: SUMITOMO RUBBER INDUSTRIES, LTD., Kobe-shi, Hyogo (JP)

(72) Inventors: Masashi Hamakubo, Kobe (JP); Akihiro Mine, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/030,298

(22) PCT Filed: Sep. 25, 2014

(86) PCT No.: PCT/JP2014/075519
§ 371 (c)(1),
(2) Date: Apr. 18, 2016

(87) PCT Pub. No.: WO2015/060062
PCT Pub. Date: Apr. 30, 2015

(65) Prior Publication Data
US 2016/0251190 A1 Sep. 1, 2016

(30) Foreign Application Priority Data

Oct. 22, 2013 (JP) .................................. 2013-219229
Jul. 3, 2014 (JP) .................................. 2014-137951

(51) Int. Cl.
*B65H 27/00* (2006.01)
*C08L 23/16* (2006.01)

(52) U.S. Cl.
CPC .............. *B65H 27/00* (2013.01); *C08L 23/16* (2013.01); *B65H 2401/111* (2013.01);
(Continued)

(58) Field of Classification Search
CPC ... Y10T 29/49549; C08L 23/16; B65H 27/00; B65H 2402/80; B65H 2404/11;
(Continued)

(56) References Cited

U.S. PATENT DOCUMENTS 6,184,295 B1 2/2001 Okuyama
6,273,415 B1 * 8/2001 Tengo .................... B65H 27/00
271/109

(Continued)

FOREIGN PATENT DOCUMENTS

JP    8-334939 A   12/1996
JP    11-236465 A   8/1999
(Continued)

OTHER PUBLICATIONS

International Search Report, issued in PCT/JP2014/075519, dated Dec. 16, 2014.
(Continued)

*Primary Examiner* — Jason L Vaughan
(74) *Attorney, Agent, or Firm* — Birch, Stewart, Kolasch & Birch, LLP (57) ABSTRACT

Provided is a paper feeding roller in which recesses due to deformation are unlikely to be formed even when contact with another roller in one location continues for a comparatively long period of time, particularly as a conveying roller or the like. A paper feeding roller that has a shaft measuring 6 mm in exterior diameter pressure-welded to the outer circumferential surface under a load of 600 g in a high-temperature environment of 60° C. for 24 hours is left at room temperature for eight hours while being pressure-welded, after which the recess amount obtained using the difference $(T)_0 - T_1$, between the thickness $T_1$ (mm) of the
(Continued)

position where the shaft was pressure-welded and the thickness $T_0$ (mm) of a position where the shaft was not pressure-welded, is 0.1 mm or less.

6 Claims, 1 Drawing Sheet

(52) U.S. Cl.
CPC ...... *B65H 2402/80* (2013.01); *B65H 2404/11* (2013.01); *B65H 2601/24* (2013.01)

(58) Field of Classification Search
CPC .......... B65H 2601/24; B65H 2401/111; B65H 3/06; B65H 3/038
USPC .............................................. 492/59, 33, 36
See application file for complete search history.

(56) References Cited

U.S. PATENT DOCUMENTS

| | | | | |
|---|---|---|---|---|
| 7,735,702 | B2* | 6/2010 | Hikita | B29C 47/0021 226/190 |
| 8,211,000 | B2* | 7/2012 | Marui | B29C 44/50 29/895.3 |
| 8,807,554 | B2* | 8/2014 | Mine | B65H 5/06 271/109 |
| 8,986,182 | B2* | 3/2015 | Tamura | F16C 13/00 492/48 |
| 2002/0166918 | A1* | 11/2002 | Takahashi | B65H 19/1821 242/555.6 |
| 2007/0088128 | A1* | 4/2007 | Minagoshi | B65H 27/00 525/192 |
| 2011/0130259 | A1 | 6/2011 | Ito et al. | |
| 2011/0306481 | A1 | 12/2011 | Mine et al. | |
| 2013/0109553 | A1* | 5/2013 | Mine | B65H 27/00 492/59 |
| 2014/0087932 | A1 | 3/2014 | Ito et al. | |
| 2014/0296049 | A1 | 10/2014 | Mine et al. | |

FOREIGN PATENT DOCUMENTS

| | | |
|---|---|---|
| JP | 2003-342480 A | 12/2003 |
| JP | 2010-224333 A | 12/2003 |
| JP | 2011-116480 A | 6/2011 |
| JP | 2014-196428 A | 10/2014 |

OTHER PUBLICATIONS

Written Opinion of the International Searching Authority, issued in PCT/JP2014/075519 (PCT/ISA/237), dated Dec. 16, 2014.

* cited by examiner

PAPER FEEDING ROLLER

FIELD OF THE ART

The present invention relates to a paper feeding roller used for paper feeding, for example, in an image forming apparatus.

BACKGROUND ART

A paper feeding roller is incorporated, for example, in a paper feeding mechanism of an image forming apparatus, such as an electrostatic copying machine, a laser printer, a plain paper facsimile machine, or a multifunction apparatus combining the above, etc.

As examples of paper feeding rollers, paper supplying rollers, conveying rollers, platen rollers, paper ejecting rollers, etc., each of which rotates while contacting a sheet of paper, plastic film, etc., to convey the sheet by friction, can be cited.

Conventionally as the paper feeding roller, a roller made of any of various rubbers, for example, natural rubber (NR), urethane rubber, ethylene propylene diene rubber (EPDM), polynorbornene rubber, silicone rubber, polyethylene chloride rubber, etc., is generally used. EPDM, which is excellent in ozone resistance, weather resistance, etc., is preferable.

The paper feeding roller is formed by molding the rubber, such as EPDM, etc., to a tubular shape and then crosslinking the rubber. A shaft coupled to a driving system arranged to perform paper feeding is inserted through and fixed in a central through hole of the paper feeding roller.

A peroxide crosslinking agent may be used to crosslink EPDM (see Patent Document 1).

Also, for a paper feeding roller constituted of a rubber composition combining EPDM and a peroxide crosslinking agent, using two or more types of EPDM of different ethylene content as the EPDM to reduce tension set to prevent lowering of drag torque by subsidence of inner diameter of the through hole due to aging while imparting an appropriate hardness to the paper feeding roller without filling with a high amount of a filler and lowering wear resistance, and further using, in addition to EPDM, isoprene rubber (IR) or styrene butadiene rubber (SBR) in combination as a rubber component to prevent lowering of friction coefficient $\mu$ due to accumulation of paper dust through repeated paper feeding, etc., have been examined (see Patent Document 2).

PRIOR ART DOCUMENTS

Patent Documents

Patent Document 1: Japanese Unexamined Patent Application Publication No. 08-334939
Patent Document 2: Japanese Unexamined Patent Application Publication No. 2011-116480

SUMMARY OF THE INVENTION

Object to be Achieved by the Invention

In particular, as a conveying roller, etc., a paper feeding roller is used in a state of being in constant contact with a roller, called a counter roller, which is made of resin or made of metal or is the same type of paper feeding roller, etc.

However, while an image forming apparatus is in storage before use is started or while the image forming apparatus is stopped for a comparatively long period even after use is started, a state in which the paper feeding roller contacts the other roller at a single location is continued.

Therefore, at a position at which the paper feeding roller continues to contact the other roller, deformation occurs due to contact pressure and this remains as a recess (distortion), and a problem, such as emission of sound when the paper feeding roller is rotated or inability to convey a sheet normally, may occur due to influence of the recess.

Although for example in Patent Document 1, a compression set characteristic is cited as an evaluation item of a paper feeding roller, according to examination by the inventor, whether or not the recess due to deformation forms cannot be judged by simply examining a general compression set characteristic.

The present invention provides a paper feeding roller, with which, especially in use as a conveying roller, etc., a recess due to deformation is unlikely to form even when a state of being in contact with another roller at a single location continues for a comparatively long period.

Means for Achieving the Object

A paper feeding roller according to the present invention is formed of a rubber composition to have a tubular shape, having a through hole through which a shaft is inserted, and has the shaft inserted through and fixed in the through hole. The paper feeding roller is characterized in that after leaving still for 24 hours in a state where another shaft of $\phi 6$ mm outer diameter is press-contacted against a single location of an outer peripheral surface of the paper feeding roller by applying a load of 600 g and under a high temperature environment of 60° C. and then leaving still for 8 hours at room temperature while maintaining the press-contacted state, a recess amount, determined from a thickness $T_1$ (mm) at a position at which the shaft was press-contacted and a thickness $T_0$ (mm) at a position at which the shaft was not press-contacted and using formula (1):

$$\text{Recess amount} = T_0 - T_1 \tag{1}$$

is not more than 0.1 mm.

Effect(s) of the Invention

With the present invention, by defining the recess amount, measured by the measurement method described above, to be not more than 0.1 mm, a paper feeding roller can be provided with which, especially in use as a conveying roller, etc., a recess due to deformation is unlikely to form even when a state of being in contact with another roller at a single location continues for a comparatively long period.

DESCRIPTION OF EMBODIMENTS

A paper feeding roller according to the present invention is formed of a rubber composition to have a tubular shape, having a through hole through which a shaft is inserted, and has the shaft inserted through and fixed in the through hole, and is characterized in that after leaving still for 24 hours in a state where another shaft of φ6 mm outer diameter is press-contacted against a single location of an outer peripheral surface by applying a load of 600 g and under a high temperature environment of 60° C. and then leaving still for 8 hours at room temperature while maintaining the press-contacted state, a recess amount, determined from a thickness $T_1$ (mm) at a position at which the shaft was press-contacted and a thickness $T_0$ (mm) at a position at which the shaft was not press-contacted and using formula (1):

$$\text{Recess amount} = T_0 - T_1 \quad (1)$$

is not more than 0.1 mm.

With the present invention, by defining the recess amount, measured by the measurement method described above, to be not more than 0.1 mm, a paper feeding roller can be provided with which, especially in use as a conveying roller, etc., a recess due to deformation is unlikely to form even when a state of being in contact with another roller at a single location continues for a comparatively long period.

Even in the above range, the recess amount is preferably not more than 0.08 mm and especially preferably not more than 0.06 mm in consideration of further improving the above effect.

Needless to say, a lower limit of the recess amount is 0 mm. That is, it is most ideal for a recess not to form at all.

<<Rubber Composition (First)>>

A paper feeding roller satisfying the recess amount range above may be formed of any of various rubber compositions.

As an example of such a rubber composition, a rubber composition where a combination, combining two or more types of EPDM of different ethylene content as rubber components or combining one type or two or more types of EPDM with another rubber, that is, a combination of at least two types of rubber that includes EPDM is combined with a peroxide crosslinking agent as a crosslinking agent can be cited.

With the rubber composition, in order to form a paper feeding roller, with which the recess amount range is satisfied and a recess due to deformation is unlikely to form even if a state of being in contact with another roller at a single location continues for a comparatively long period, a ratio B/A of the ethylene content A (mass %) of EPDM in the rubber components and a blending proportion B (mass %) of the peroxide crosslinking agent with respect to a total amount of the rubber components is required to be not less than 0.046.

Also, to impart a satisfactory wear resistance to the paper feeding roller, a blending proportion of EPDM is required to be not less than 50 mass % in the total amount of the rubber components.

<Rubber Component>

As the rubber components, a combination of at least two types of rubber containing EPDM at a blending proportion of not less than 50 mass % in the total amount is used as mentioned above.

As a specific example of the combination,
(1) a combination of just two or more types of EPDM of different ethylene content or
(2) a combination of EPDM and another rubber can be cited.

Of the above, the combination of (1) has an advantage that wear resistance of the paper feeding roller can be improved significantly because the total amount (100 mass %) of the rubber components is EPDM.

Also, by using two or more types of EPDM of different ethylene content in combination, tension set can be reduced to prevent lowering of drag torque by subsidence of inner diameter of the through hole due to aging while imparting an appropriate hardness to the paper feeding roller without filling with a high amount of a filler and lowering wear resistance.

It is especially preferable to use one type or two or more types of low-ethylene EPDM with an ethylene content of not more than 55 mass % and one type or two or more types of high-ethylene EPDM with an ethylene content exceeding 55 mass % in combination.

With such a combination, by a function of the high-ethylene EPDM, the paper feeding roller can be imparted with an appropriate hardness without filling with a high amount of a filler and lowering wear resistance.

Even in the above range, the ethylene content of the high-ethylene EPDM is preferably not less than 62 mass % and especially preferably not less than 65 mass % in consideration of further improving the above effect.

However, if the ethylene content is too high, kneading is made difficult due to excessive crystallization and therefore even in the above range, the ethylene content of the high-ethylene EPDM is preferably not more than 80 mass %

Also, by a function of the low-ethylene EPDM, the tension set of the paper feeding roller can be reduced to prevent lowering of the drag torque by subsidence of the inner diameter of the through hole due to aging.

Even in the above range, the ethylene content of the low-ethylene EPDM is preferably not more than 52 mass % in consideration of further improving the above effect.

However, if the ethylene content is too low, mechanical characteristics of the paper feeding roller may degrade and therefore even in the above range, the ethylene content of the low-ethylene EPDM is preferably not less than 40 mass %

The blending proportion of the high-ethylene EPDM and the low-ethylene EPDM as expressed as the blending proportion of the low-ethylene EPDM in the total amount of EPDM is preferably not less than 30 mass % and preferably not more than 80 mass %.

When the blending proportion of the low-ethylene EPDM deviates from the above range either at the lower limit side or the upper limit side, a recess due to deformation is likely to form when a state of being in contact with another roller at a single location continues for a comparatively long period especially in the case of use as a conveying roller, etc., and it may not be possible to form the paper feeding roller according to the present invention that satisfies the range of the recess amount, measured by the measurement method described above and determined by formula (1), of not more than 0.1 mm.

Also, if the blending proportion of the low-ethylene EPDM is less than the above range, the effect, due to the low-ethylene EPDM, of reducing the tension set of the paper feeding roller to suppress the lowering of the drag torque may not be obtained sufficiently.

On the other hand, if the blending proportion of the low-ethylene EPDM exceeds the above range, the amount of the high-ethylene EPDM becomes low relatively and the effect, due to the high-ethylene EPDM, of imparting an appropriate hardness to the paper feeding roller without filling with a high amount of a filler and lowering wear resistance may not be obtained sufficiently.

As the EPDM in the combination of (2), one type may be used alone or two or more types differing in ethylene content may be used in combination. As the EPDM of two or more types differing in ethylene content, the high-ethylene EPDM and the low-ethylene EPDM described in (1) are preferable. The same applies to the blending proportion of both types of EPDM.

As the other rubber to be used in combination with EPDM, for example, at least one type selected from a group consisting of IR, SBR, and natural rubber is preferable.

By using such another rubber in combination, lowering of friction coefficient μ due to accumulation of paper dust through repeated paper feeding can be suppressed. Also especially when IR is used in combination, the paper feeding roller can be improved in wear resistance as well, and when SBR is used in combination, the paper feeding roller can be improved in hardness as well.

The blending proportion of EPDM is restricted to not less than 50 mass % in the total amount of the rubber components. If the blending proportion of EPDM is less than this range, the paper feeding roller cannot be imparted with a satisfactory wear resistance.

On the other hand, by making the blending proportion of EPDM be within the range of not less than 50 mass %, the paper feeding roller can be imparted with a satisfactory wear resistance. In consideration of further improving the above effect, the blending proportion of EPDM is preferably not less than 60 mass % in the total amount of the rubber components.

However, in consideration of satisfactorily maintaining the effects due to using the other rubbers in combination, the blending proportion of EPDM is preferably not more than 80 mass % and especially preferably not more than 70 mass % in the total amount of the rubber components.

(EPDM)

As the EPDM, any of various copolymers obtained by copolymerizing ethylene, propylene, and a diene may be used. As the diene, ethylidene norbornene (ENB), dicyclopentadiene (DCPD), etc., can be cited.

Among the types of EPDM, as the high-ethylene EPDM with an ethylene content exceeding 55 mass %, although either an oil-extended EPDM extended with an extender oil or a non-oil-extended EPDM not extended with an extender oil may be used, in consideration of preventing the lowering of the friction coefficient μ due to bleeding of extender oil, the high-ethylene EPDM is preferably a non-oil-extended EPDM.

Examples of such non-oil-extended, high-ethylene EPDM include but are not restricted to one type or two or more types among Esprene (registered trademark) 502 [ethylene content: 56 mass %, diene content: 4.0 mass %], 301 [ethylene content: 62 mass %, diene content: 3.0 mass %], 512F [ethylene content: 65 mass %, diene content: 4.0 mass %], and 586[ethylene content: 66 mass %, diene content: 12.5 mass %] manufactured by Sumitomo Chemical Co., Ltd., NORDEL (registered trademark) IP3720P [ethylene content: 70 mass %, diene content: 0.6 mass %], IP3722P [ethylene content: 71 mass %, diene content: 0.5 mass %], IP3745P [ethylene content: 70 mass %, diene content: 0.5 mass %], IP3760P [ethylene content: 67 mass %, diene content: 2.2 mass %], IP4725P [ethylene content: 70 mass %, diene content: 4.9 mass %], IP4760P [ethylene content: 67 mass %, diene content: 4.9 mass %], IP4770R [ethylene content: 70 mass %, diene content: 4.9 mass %], IP4770P [ethylene content: 70 mass %, diene content: 4.9 mass %], IP4785HM [ethylene content: 68 mass %, diene content: 4.9 mass %], and IP4820P [ethylene content: 85 mass %, diene content: 4.9 mass %] manufactured by The Dow Chemical Company, etc.

However, an oil-extended, high-ethylene EPDM may also be used.

Examples of such oil-extended, high-ethylene EPDM include but are not restricted to one type or two or more types among Esprene 601F [ethylene content: 59 mass %, diene content: 3.5 mass %, oil extension: 70 phr], 603 [ethylene content: 64 mass %, diene content: 4.5 mass %, oil extension: 40 phr], 670F [ethylene content: 66 mass %, diene content: 4.0 mass %, oil extension: 100 phr], 600F [ethylene content: 66 mass %, diene content: 4.0 mass %, oil extension: 100 phr], and 6101 [ethylene content: 70 mass %, diene content: 6.5 mass %, oil extension: 70 phr] manufactured by Sumitomo Chemical Co., Ltd., etc.

As the low-ethylene EPDM with an ethylene content not more than 55 mass %, although either an oil-extended EPDM extended with an extender oil or a non-oil-extended EPDM not extended with an extender oil may be used, in consideration of preventing the lowering of the friction coefficient μ due to bleeding of extender oil, the low-ethylene EPDM is also preferably a non-oil-extended EPDM.

Examples of such non-oil-extended, low-ethylene EPDM include but are not restricted to one type or two or more types among Esprene 301A [ethylene content: 50 mass %, diene content: 5.0 mass %], 501A [ethylene content: 52 mass %, diene content: 4.0 mass %], 505A [ethylene content: 50 mass %, diene content: 9.5 mass %], 505 [ethylene content: 50 mass %, diene content: 10.0 mass %], 532 [ethylene content: 51 mass %, diene content: 3.5 mass %], 552 [ethylene content: 55 mass %, diene content: 4.0 mass %], 5206F [ethylene content: 54 mass %, diene content: 8.5 mass %], and 5527F [ethylene content: 54 mass %, diene content: 8.5 mass %] manufactured by Sumitomo Chemical Co., Ltd., NORDEL IP3430 [ethylene content: 42 mass %, diene content: 0.7 mass %], IP3640 [ethylene content: 55 mass %, diene content: 1.8 mass %], IP4520 [ethylene content: 50 mass %, diene content: 4.9 mass %], IP4570 [ethylene content: 50 mass %, diene content: 4.9 mass %], IP4640 [ethylene content: 55 mass %, diene content: 4.9 mass %], and IP5565 [ethylene content: 50 mass %, diene content: 7.5 mass %] manufactured by The Dow Chemical Company, etc.

However, an oil-extended, low-ethylene EPDM may also be used.

Esprene 7456 [ethylene content: 53 mass %, diene content: 10.5 mass %, oil extension: 20 phr] manufactured by Sumitomo Chemical Co., Ltd., etc., can be cited as an example, but such oil-extended, low-ethylene EPDM is not restricted thereto.

(Other Rubbers)

As the IR among the other rubbers, any of various polymers having a polyisoprene structure may be used.

Examples of such IR include but are not restricted to at least one type among Nipol (registered trademark) IR2200 and IR2200R manufactured by Zeon Corporation, etc.

As the SBR, any of various copolymers obtained by copolymerizing styrene and butadiene by an emulsion polymerization method, a solution polymerization method, etc., may be used.

Also, as the SBR, although either an oil-extended SBR extended with an extender oil or a non-oil-extended SBR not extended with an extender oil may be used, in consideration of preventing the lowering of the friction coefficient μ due to bleeding of extender oil, the SBR is also preferably a non-oil-extended SBR.

Examples of such non-oil-extended SBR include but are not restricted to one type or two or more types among Nipol 1500, 1502, NS116R, NS210, NS310S, and NS616 manufactured by Zeon Corporation, Emulsion SBR 1502 manufactured by Sumitomo Chemical Co., Ltd., etc.

<Peroxide Crosslinking Agent>

Examples of the peroxide crosslinking agent include but are not restricted to one type or two or more types among benzoyl peroxide, 1,1-bis(tert-butylperoxy)-3,3,5-trimethylcyclohexane, 2,5-dimethyl-2, 5-di(benzoylperoxy) hexane, di(tert-butylperoxy)diisopropylbenzene, 1,4-bis [(tert-butyl)peroxyisopropyl]benzene, di(tert-butylperoxy)benzoate, tert-butyl peroxybenzoate, dicumyl peroxide (DCP), tert-butyl cumyl peroxide, 2,5-dimethyl-2,5-di(tert-butylperoxy) hexane, di-tert-butyl peroxide, 2,5-dimethyl-2,5-di(tert-butylperoxy)-3-hexene, etc.

(Blending Proportion)

As described above, the blending proportion B (mass %) of the peroxide crosslinking agent with respect to the total amount of the rubber components is set so that the ratio B/A with respect to the ethylene content A (mass %) of EPDM is not less than 0.046.

If the ratio B/A falls below the above range, a recess due to deformation is likely to form when a state of being in contact with another roller at a single location continues for a comparatively long period especially in the case of use as a conveying roller, etc., and the paper feeding roller according to the present invention that satisfies the range of the recess amount, measured by the measurement method described above and determined by formula (1), of not more than 0.1 mm cannot be formed.

On the other hand, by setting the blending proportion B of the peroxide crosslinking agent so that the ratio B/A satisfies the above range, a recess due to deformation is unlikely to form even when a state of being in contact with another roller at a single location continues for a comparatively long period especially in the case of use as a conveying roller, etc., and the paper feeding roller according to the present invention that satisfies the range of the recess amount of not more than 0.1 mm can be formed.

Here, with the combination (2) of EPDM and another rubber described above, although the blending proportion of the EPDM is restricted to be not less than 50 mass % of the total amount of the rubber components as described above, as long as the blending proportion is within that range, the paper feeding roller according to the present invention that satisfies the range of the recess amount of not more than 0.1 mm can be formed regardless of the blending proportion by setting the blending proportion B (mass %) of the peroxide crosslinking agent so that the ethylene content A (mass %) of the EPDM itself and the blending proportion B of the peroxide crosslinking agent satisfy the range of the ratio B/A described above.

The upper limit of the ratio B/A is not restricted in particular. However, if the amount of the peroxide crosslinking agent is too high, scorching may occur during molding. The blending proportion B of the peroxide crosslinking agent with respect to the total amount of the rubber components is thus preferably not more than 5 mass % (not more than 5 parts by mass with respect to 100 parts by mass of the total amount of the rubber components) regardless of the ethylene content A of the EPDM.

The ethylene content A of the EPDM in the case of using two or more types of EPDM of different ethylene content in combination may be expressed as a sum total of the respective products of the ethylene content of each type of EPDM and the proportion occupied by that EPDM in the total amount of all of the EPDM.

For example, if the EPDM is an 80:20 mass ratio mixture of a low-ethylene EPDM with an ethylene content of 50 mass % and a high-ethylene EPDM with an ethylene content of 70 mass %, the ethylene content A of the entire EPDM is:

$$A=50\times0.8+70\times0.2=54 \text{ mass \%}$$

Also, if the EPDM is an oil-extended EPDM, the above calculation is performed on the basis of the mass of solids (EPDM) within the oil-extended EPDM.

<Crosslinking Assistant>

Preferably, a crosslinking assistant is blended together with the peroxide crosslinking agent in the rubber composition.

The hardness of the paper feeding roller according to the present invention can thereby be improved to further improve the effect that a recess due to deformation is unlikely to form even if a state of being in contact with another roller at a single location continues for a comparatively long period. Also, the effect of reducing the tension set to suppress the lowering of the drag torque and the effect of improving the wear resistance of the paper feeding roller can also be improved.

As the crosslinking assistant, any of various compounds capable of assisting the crosslinking of the rubber components by the peroxide crosslinking agent may be used.

Examples of the crosslinking assistant include but are not restricted to co-crosslinking agents, such as trimethylpropane trimethacrylate and other higher esters of methacrylic acid, triallyl isocyanurate (TAIL), etc., and sulfur, dibenzoylquinone dioxime, 1,2-polybutadiene, etc., may also be used.

A blending proportion of the crosslinking assistant with respect to 100 parts by mass of the total amount of the rubber components is preferably not less than 1 parts by mass and preferably not more than 3 parts by mass.

If the blending proportion of the crosslinking assistant is less than the above range, none of the effects of using the crosslinking assistant in combination may be obtained sufficiently.

On the other hand, if the blending proportion of the crosslinking assistant exceeds the above range, excess crosslinking assistant may bloom on an outer peripheral surface of the paper feeding roller and the friction coefficient μ may decrease.

<Other Components>

A filler or any of various additives, such as oil, plasticizer, etc., may further be selected as appropriate and blended in the rubber composition.

However, an oil or a plasticizer may bleed to the outer peripheral surface of the paper feeding roller and cause lowering of the friction coefficient μ and is thus preferably not blended (preferably removed) basically and even in the case of blending, it is preferable to blend at an amount of not more than approximately 2 parts by mass with respect to 100 parts by mass of the total amount of the rubber components.

As an example of the filler, one type or two or more types among carbon black, calcium carbonate, zinc oxide, silica, clay, talc, magnesium carbonate, aluminum hydroxide, titanium oxide, etc., can be cited.

When a filler is blended, the hardness of the paper feeding roller according to the present invention can be improved to further improve the effect that a recess due to deformation is unlikely to form even if a state of being in contact with another roller at a single location continues for a comparatively long period. Also, the effect of reducing the tension set to suppress the lowering of the drag torque and the effect of improving the wear resistance of the paper feeding roller can also be improved.

A blending proportion of the filler with respect to 100 parts by mass of the total amount of the rubber components is preferably not less than 10 parts by mass and preferably not more than 75 parts by mass.

If the blending proportion of the filler is less than the above range, none of the effects of blending the filler may be obtained sufficiently.

On the other hand, if the blending proportion of the filler exceeds the above range, the hardness of the paper feeding roller may increase to lower the friction coefficient and the rubber composition that is to be the base of the paper feeding roller may increase in viscosity to make molding difficult. It is therefore preferable to blend an appropriate amount of the filler upon ascertaining these characteristics.

Also, if two or more types of filler are used in combination, the blending proportions of the respective fillers may be set so that the total blending proportion is within the above range.

Also, if an oil or plasticizer, etc., is blended in the rubber composition or an oil-extended EPDM or oil-extended SBR is used as a rubber component, the filler may be blended in excess of the above range to secure hardness of the paper feeding roller, etc.

<<Rubber Composition (Second)>>

The paper feeding roller according to the present invention that satisfies the recess amount range described above may also be formed by another rubber composition besides the above. As such another rubber composition, for example, a rubber composition containing the rubber components of (1) or (2) described above and a sulfur-based crosslinking agent can be cited.

<Rubber Component>

As the rubber components, it is especially preferable to use the two types of EPDM of high-ethylene EPDM and low-ethylene EPDM described above in combination.

In the combination, the blending proportion of the high-ethylene EPDM and the low-ethylene EPDM as expressed as the blending proportion of the low-ethylene EPDM in the total amount of EPDM is preferably not less than 15 mass % and preferably not more than 25 mass %

When the blending proportion of the low-ethylene EPDM deviates from the above range either at the lower limit side or the upper limit side, a recess due to deformation is likely to form when a state of being in contact with another roller at a single location continues for a comparatively long period especially in the case of use as a conveying roller, etc., and it may not be possible to form the paper feeding roller according to the present invention that satisfies the range of the recess amount, measured by the measurement method described above and determined by formula (1), of not more than 0.1 mm.

Also, if the blending proportion of the low-ethylene EPDM is less than the above range, the effect, due to the low-ethylene EPDM, of reducing the tension set of the paper feeding roller to suppress the lowering of the drag torque may not be obtained sufficiently.

On the other hand, if the blending proportion of the low-ethylene EPDM exceeds the above range, the amount of the high-ethylene EPDM becomes low relatively and the effect, due to the high-ethylene EPDM, of imparting an appropriate hardness to the paper feeding roller without filling with a high amount of a filler and lowering wear resistance may not be obtained sufficiently.

<Sulfur-based Crosslinking Agent>

Powdered sulfur and organic sulfur-containing compounds, etc., can be cited as examples of the sulfur-based crosslinking agent. Among these, tetramethylthiuram disulfide, N,N-dithiobismorpholine, etc., can be cited as examples of the organic sulfur-containing compounds, etc. Sulfur, such as powdered sulfur, etc., is especially preferable.

A blending proportion of sulfur with respect to 100 parts by mass of the total amount of the rubber components is preferably not less than 0.3 parts by mass and especially preferably not less than 0.5 parts by mass and preferably not more than 2 parts by mass and especially preferably not more than 1.5 parts by mass.

If the blending proportion of sulfur is less than the above range, a recess due to deformation is likely to form when a state of being in contact with another roller at a single location continues for a comparatively long period especially in the case of use as a conveying roller, etc., and it may not be possible to form the paper feeding roller according to the present invention that satisfies the range of the recess amount, measured by the measurement method described above and determined by formula (1), of not more than 0.1 mm.

Also, the crosslinking rate of the rubber composition as a whole becomes slow, causing the time required for crosslinking to become long, and productivity of the paper feeding roller may decrease.

On the other hand, if the blending proportion of sulfur exceeds the above range, crosslinking proceeds excessively so that the paper feeding roller may become too hard or excess sulfur tends to bloom on the outer peripheral surface of the paper feeding roller, and in either case, the friction coefficient $\mu$ decreases and satisfactory paper feeding may be disabled.

<Accelerant, Accelerating Assistant>

An accelerator and an accelerating assistant, having a function of accelerating the crosslinking by the sulfur-based crosslinking agent, are preferably blended in the rubber composition.

As an example of the accelerator, one type or two or more types among inorganic accelerators, such as slaked lime, magnesia (MgO), litharge (PbO), etc., and the various organic accelerators, etc., listed below can be cited.

Dithiocarbamate accelerators, such as piperidine pentamethylene dithiocarbamate (PPD), zinc dimethyldithiocarbamate (PZ), zinc diethyldithiocarbamate (EZ), zinc dibutyldithiocarbamate (BZ), zinc N-ethyl-N-phenyldithiocarbamate (PX), zinc N-pentamethylene dithiocarbamate (ZP), zinc dibenzyldithiocarbamate (ZTC), sodium dibutyldithiocarbamate (TP), copper dimethyldithiocarbamate (TTCU), ferric dimethyldithiocarbamate (TTFE), tellurium diethyldithiocarbamate (TTTE), etc. N-cyclohexyl-2-benzothiazylsulfenamide (CZ), N,N-dicyclohexyl-2-benzothiazolylsulfenamide (DZ-G), N-oxydiethylene-2-benzothiazolylsulfenamide (MSA), N-tert-butyl-2-benzothiazolylsulfenamide (NS), etc.

Thiuram-based accelerators, such as tetramethylthiuram disulfide (TT), tetraethylthiuram disulfide (TET), tetrabutylthiuram disulfide (TBT), tetrakis(2-ethylhexyl)thiuram disulfide (TOT-N), tetramethylthiurammonosulfide (TS), dipentamethylenethiuram tetrasulfide (TRA), etc.

As the accelerator, one type or two or more types of the optimal accelerator may be selected and used from among the various accelerators according to the type of crosslinking agent used in combination.

Also, accelerators differ in the mechanism of crosslinking acceleration according to type and it is thus preferable to use two or more types in combination. Although the blending proportion of each individual accelerator used in combination may be set arbitrarily, it is preferably not less than 0.3 parts by mass and especially preferably not less than 0.5 parts by mass and preferably not more than 3 parts by mass and especially preferably not more than 2.5 parts by mass with respect to 100 parts by mass of the total amount of the rubber components, respectively.

As an example of the accelerating assistant, one type or two or more types among metal compounds, such as zinc oxide, etc., fatty acids, such as stearic acid, oleic acid, cottonseed fatty acid, etc., and other conventionally known accelerating assistants can be cited.

The blending proportion of the accelerating assistant may be set as appropriate in accordance with the type and combination of the rubber components, the types and combination of the crosslinking agent and the accelerator, etc.

<Others>

A filler mentioned above or any of various additives, such as oil, plasticizer, etc., may further be selected as appropriate and blended in the rubber composition as required.

However, an oil or a plasticizer is preferably not blended (preferably removed) basically by the reason mentioned above, and even in the case of blending, it is preferable to blend at an amount of not more than approximately 2 parts by mass with respect to 100 parts by mass of the total amount of the rubber components.

As the filler, one type or two or more types among the various fillers described above can be cited.

The blending proportion of the filler with respect to 100 parts by mass of the total amount of the rubber components is preferably not less than 180 parts by mass and preferably not more than 220 parts by mass.

If the blending proportion of the filler is less than the above range, none of the effects of blending the filler may be obtained sufficiently.

On the other hand, if the blending proportion of the filler exceeds the above range, the hardness of the paper feeding roller may increase to lower the friction coefficient and the rubber composition that is to be the base of the paper feeding roller may increase in viscosity to make molding difficult. It is therefore preferable to blend an appropriate amount of the filler upon ascertaining these characteristics.

Also, if two or more types of filler are used in combination, the blending proportions of the respective fillers may be set so that the total blending proportion is within the above range.

Also, if an oil or plasticizer, etc., is blended in the rubber composition or an oil-extended EPDM, etc., is used as a rubber component, the filler may be blended in excess of the above range to secure hardness of the paper feeding roller, etc.

<<Paper Feeding Roller>>

Figure 1:
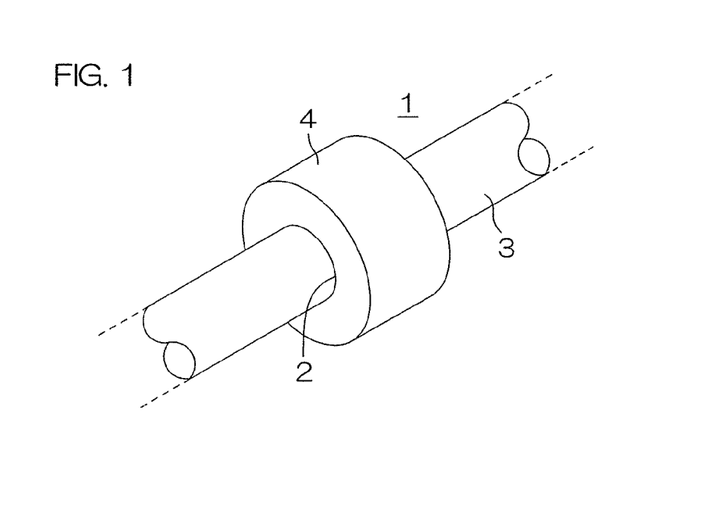
FIG. 1 is a perspective view of an example of a preferred embodiment of the paper feeding roller according to the present invention.

FIG. 1 is a perspective view of an example of a preferred embodiment of the paper feeding roller according to the present invention.

With reference to FIG. 1, the paper feeding roller 1 of the present example is formed, for example, by molding any of the rubber compositions described above to a tubular shape and then crosslinking the rubber composition. A through hole 2 of circular cross section is provided at a center of the paper feeding roller 1 and a circular columnar, coupled to an unillustrated driving system, etc., is inserted through and fixed in the through hole 2. An outer peripheral surface 4 of the paper feeding roller 1 that contacts a sheet is formed to a tubular shape concentric to the through hole 2 and the shaft 3.

The paper feeding roller 1 and the shaft 3 are fixed to each other so that idle rotation will not occur, for example, by press-fitting the shaft 3, with an outer diameter greater than an inner diameter of the through hole 2 of the paper feeding roller 1, into the through hole 2.

That is, a fixed drag torque (limiting torque at which idle rotation does not occur) is secured between the two components by an interference based on the diameter difference between the two components.

The shaft 3 is formed, for example, of a metal, ceramic, hard resin, etc.

A plurality of the paper feeding rollers 1 may be fixed as necessary to a plurality of locations of a single shaft 3.

The paper feeding roller 1 may be manufactured by subjecting the rubber composition, for example, to molding to the tubular shape by an extrusion molding method, etc., followed by crosslinking by a press crosslinking method, etc.

The outer peripheral surface 4 of the paper feeding roller 1 may be subject as necessary to polishing to a prescribed surface roughness or to knurling, surface texturing, etc., at any point in the manufacturing process.

Also, both ends of the paper feeding roller 1 may be cut to make the outer peripheral surface 4 be of a prescribed width.

The outer peripheral surface 4 of the paper feeding roller 1 may be coated with any coating layer. Also, the paper feeding roller 1 may be formed to a two layer structure with an outer layer at the outer peripheral surface 4 side and an inner layer at the through hole 2 side. In this case, it is preferable for at least the outer layer to be formed of any of the rubber compositions described above.

However in consideration of simplifying the structure, improving productivity, and reducing the manufacturing cost, it is preferable for the paper feeding roller 1 to have a single layer structure such as shown in FIG. 1.

Also, the paper feeding roller 1 may be a porous structure. However in consideration of forming the paper feeding roller 1 to be excellent in the effects of being unlikely to decrease in friction coefficient $\mu$, having an appropriate hardness, and being unlikely for a recess due to deformation to form even when a state of being in contact with another roller at a single location is continued for a comparatively long period, the effect of being made low in tension set to suppress degradation of drag torque, and the further effect of improving wear resistance, it is preferable that the paper feeding roller 1 be practically a non-porous structure.

If the paper feeding roller 1 is to be used as a conveying roller in a state of contacting a counter roller, the paper feeding roller 1 preferably has a type A durometer hardness of not less than 50 and not more than 85 to perform paper feeding satisfactorily.

The through hole 2 may, depending on the usage of the paper feeding roller 1, be provided at a position that is decentered from the center of the paper feeding roller 1. Also, the outer peripheral surface 4 of the paper feeding roller 1 does not have to have the tubular shape and may have an irregular shape, such as a shape with which a portion of the outer peripheral surface 4 is notched in a planar shape, etc.

To manufacture the paper feeding roller 1 with the irregular shape, the paper feeding roller 1 with the irregular shape may be molded and crosslinked directly by the manufacturing method described above or the paper feeding roller 1 that has been manufactured to have the tubular shape may be made to have the irregular shape by post-processing.

Also, the through hole 2 of the paper feeding roller 1 that has been manufactured to have the tubular shape may be press-fitted with the shaft 3 that has been made to have a modified shape corresponding to the irregular shape of the paper feeding roller 1 to modify the shape of the paper feeding roller 1 to the irregular shape. In this case, the processability can be improved because the polishing, knurling, surface texturing, etc., of the outer peripheral surface 4 can be performed on the tubular outer peripheral surface 4 before shape modification.

<<Recess Test>>

Figure 2:
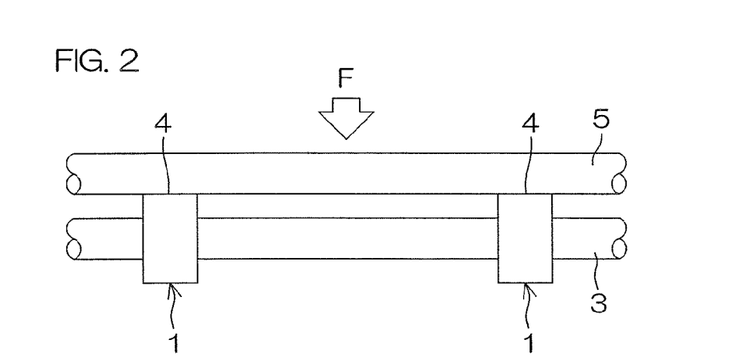
FIG. 2 is a front view for describing a testing method for reproducing recesses due to deformation in paper feeding rollers.
Figure 3:
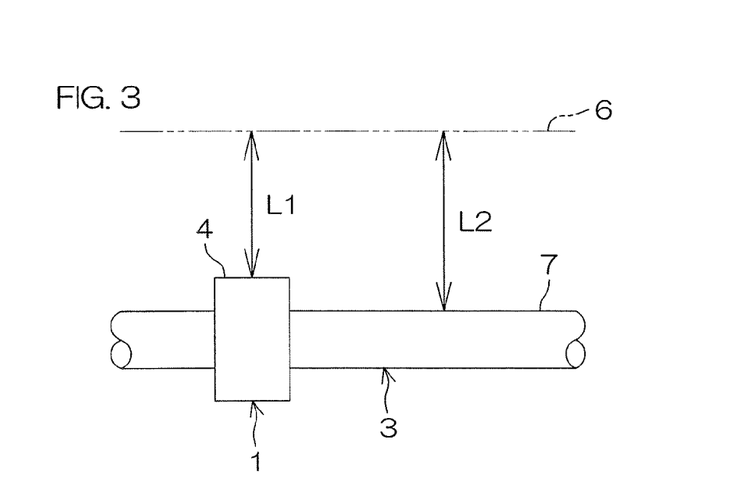
FIG. 3 is a front view for describing a method for measuring a recess amount of each paper feeding roller after the test of FIG. 2.

FIG. 2 is a front view for describing a testing method for reproducing recesses due to deformation in paper feeding rollers. FIG. 3 is a front view for describing a method for measuring a recess amount of each paper feeding roller after the test of FIG. 2.

With reference to FIG. 2, with the present example, a case of reproducing recesses due to deformation in two paper feeding rollers 1 fixed to two locations of a single shaft 3 shall be described.

First, a shaft 5, made of metal and likened to a counter roller, is prepared.

Then under a high temperature environment of 60° C. temperature and in a state where the shaft 3 is fixed so as not to rotate, the shaft 5 is put into contact with the paper feeding rollers 1, fixed to the shaft 3, from above in a vertical direction while maintaining parallelism with respect to the shaft 3.

Then under the high temperature environment, the shaft 5 is put in a state of being press-contacted against the paper feeding rollers 1 by applying a load F and left still in that state for 24 hours, and after then leaving still for another 8 hours at room temperature while keeping the press-contact, the press-contact is released.

A thickness of each paper feeding roller 1 is then determined using a laser outer diameter measuring apparatus.

That is, with reference to FIG. 3, in a mode of the apparatus of determining a distance from a reference point, a distance L1 (mm) from the reference point (indicated by a straight line 6) to the outer peripheral surface 4 of the paper feeding roller 1 and a distance L2 (mm) to an outer peripheral surface 7 of the shaft 3 are measured and a thickness (mm) of the paper feeding roller 1 is determined by formula (a):

$$\text{Thickness } T = L2 - L1 \quad (a)$$

The operation is performed at a position, on a single paper feeding roller 1, at which the shaft 5 was press-contacted and a position at which the shaft 5 was not press-contacted to determine a thickness $T_0$ (mm) at the position at which the shaft was not press-contacted and a thickness $T_1$ (mm) at the position at which the shaft was press-contacted and a recess amount (mm) is determined by formula (b):

$$\text{Recess amount} = T_0 - T_1 \quad (b)$$

It may be determined that the smaller the recess amount, the less likely it is for the paper feeding roller 1 to have a recess due to deformation be formed even when a state of being in contact with another roller at a single location continues for a comparatively long period.

With the present invention, the recess amount is restricted to not more than 0.1 mm as described above.

<<Image Forming Apparatus>>

The paper feeding roller according to the present invention may be incorporated in any of various image forming apparatuses making use of electrophotography, such as a laser printer, an electrostatic copying machine, a plain paper facsimile machine, or a multifunction apparatus combining the above, etc.

As examples of paper feeding rollers, paper supplying rollers, conveying rollers, platen rollers, paper ejecting rollers, etc., each of which rotates while contacting a sheet to convey the sheet by friction, can be cited.

EXAMPLES

The material used in the following examples and comparative examples are as follows.

<Rubber Component>

(EPDM)

EPDM (I): Non-oil-extended, Esprene (registered trademark) 505A manufactured by Sumitomo Chemical Co., Ltd., ethylene content: 50 mass %, diene content: 9.5 mass %

EPDM (II): Non-oil-extended, Esprene 502 manufactured by Sumitomo Chemical Co., Ltd., ethylene content: 56 mass %, diene content: 4.0 mass %.

EPDM (III): Oil-extended, Esprene 670F manufactured by Sumitomo Chemical Co., Ltd., ethylene content: 66 mass %, diene content: 4.0 mass %, oil extension: 100 phr.

EPDM (IV): Non-oil-extended, NORDEL (registered trademark) manufactured by The Dow Chemical Company, ethylene content: 70 mass %, diene content: 4.9 mass %.

(IR)

Nipol (registered trademark) IR2200 manufactured by Zeon Corporation.

(SBR)

Non-oil-extended, Emulsion SBR 1502 manufactured by Sumitomo Chemical Co., Ltd.

<Filler>

(Carbon Black)

Carbon black (I): HAF, filler, product name SEAST 3 manufactured by Tokai Carbon Co., Ltd.

Carbon black (II): FEF, filler, product name SEAST SO manufactured by Tokai Carbon Co., Ltd.

(Calcium Carbonate)

Heavy calcium carbonate: Filler, Whiton (registered trademark) BF-300 manufactured by Shiraishi Kogyo Kaisha, Ltd.

Synthetic calcium carbonate: Filler, Hakuenka (registered trademark) CC manufactured by Shiraishi Kogyo Kaisha, Ltd., fatty acid surface treated.

<Peroxide Crosslinking Agent>

Peroxide crosslinking agent DCP: Dicumyl peroxide (DCP), Percumyl (registered trademark) D manufactured by NOF Corporation.

<Co-crosslinking Agent>

Co-crosslinking agent (I): Triallyl isocyanurate (TRIC), TAIC (registered trademark) manufactured by Nippon Kasei Chemical Co., Ltd.

Co-crosslinking agent (II): Trimethylpropane trimethacrylate, product name Hi-Cross M manufactured by Seiko Chemical Co., Ltd.

<Process Oil>

Process-oil: Paraffin-based process oil, Diana (registered trademark) Process Oil PW380 manufactured by Idemitsu Kosan Co., Ltd.

<Sulfur-based Crosslinking Agent>

High dispersing sulfur: Sulfax PS manufactured by Tsurumi Chemical Industry Co., Ltd., sulfur content: 99.5%.

<Accelerator>

Accelerator BZ: Zinc dibutyldithiocarbamate, NOCCELER (registered trademark) BZ manufactured by Ouchi Shinko Chemical Industrial Co., Ltd.

Accelerator CZ: N-cyclohexyl-2-benzothiazylsulfenamide, NOCCELER CZ manufactured by Ouchi Shinko Chemical Industrial Co., Ltd.

Accelerator TET: Tetraethylthiuram disulfide, NOCCELER TET manufactured by Ouchi Shinko Chemical Industrial Co., Ltd.

<Accelerating Assistant>

Zinc oxide: Two types of zinc oxide manufactured by Sakai Chemical Industry Co., Ltd.

Stearic acid: Product name Tsubaki manufactured by NOF Corporation.

Example 1

(Preparation of Rubber Composition)

As the rubber components, 50 parts by mass of the EPDM (I), 30 parts by mass of the IR, and 20 parts by mass of the SBR were used.

The blending proportion of the EPDM in the total amount of the rubber components was 50 mass %. Also, the ethylene content A of the EPDM was 50 mass %.

The respective components shown in Table 1 below were further blended with the rubber components and a rubber composition was prepared by kneading using a 3 L kneader and an open roll.

TABLE 1

| Component | Parts by mass |
| --- | --- |
| Carbon black (I) | 5 |
| Peroxide crosslinking agent DCP | 3 |

The parts by mass shown in Table 1 are parts by mass with respect to 100 parts by mass of the total amount of the rubber components.

The ratio B/A of the ethylene content A (=50 mass %) of the EPDM and the blending proportion B (=3 mass %) of the peroxide crosslinking agent with respect to the total amount of the rubber components was 0.060.

(Manufacture of Paper Feeding Roller)

The prepared rubber composition was extrusion molded to a tubular shape and thereafter press crosslinked under conditions of 160° C.×30 minutes to form a tubular body (cot). Then, in a state with a shaft 3 of ϕ6 mm outer diameter being press-fitted and fixed in a through hole 2 of the tubular body, an outer peripheral surface 4 was ground to an outer diameter of 13 mm using a cylindrical grinder and thereafter, cutting was performed so that a width of the outer peripheral surface 4 (length in an axial direction) became 8 mm and a paper feeding roller 1 was thereby manufactured. An inner diameter of the through hole 2 was 5.4 mm and an interference based on a diameter difference with respect to the shaft 3 was 10%.

Example 2

(Preparation of Rubber Composition)

As the rubber components, 40 parts by mass of the EPDM (I), 30 parts by mass of the EPDM (IV), and 30 parts by mass of the IR were used.

The blending proportion of the EPDM in the total amount of the rubber components was 70 mass %. Also, the ethylene content A of the EPDM was 58.57 mass %

The respective components shown in Table 2 below were further blended with the rubber components and a rubber composition was prepared by kneading using a 3 L kneader and an open roll.

TABLE 2

| Component | Parts by mass |
| --- | --- |
| Carbon black (I) | 20 |
| Heavy calcium carbonate | 40 |
| Peroxide crosslinking agent DCP | 2.7 |
| Co-crosslinking agent (I) | 2 |

The parts by mass shown in Table 2 are parts by mass with respect to 100 parts by mass of the total amount of the rubber components.

The ratio B/A of the ethylene content A (=58.57 mass %) of the EPDM and the blending proportion B (=2.7 mass %) of the peroxide crosslinking agent with respect to the total amount of the rubber components was 0.046.

(Manufacture of Paper Feeding Roller)

Besides using the rubber composition described above, a paper feeding roller 1 of the same shape and same dimensions in the state with a shaft 3 fixed thereto was manufactured in the same manner as in Example 1.

Example 3

(Preparation of Rubber Composition)

As the rubber components, 80 parts by mass of the EPDM (I) and 20 parts by mass of the EPDM (II) were used.

The blending proportion of the EPDM in the total amount of the rubber components was 100 mass %. Also, the ethylene content A of the EPDM was 51.2 mass %.

The respective components shown in Table 3 below were further blended with the rubber components and a rubber composition was prepared by kneading using a 3 L kneader and an open roll.

TABLE 3

| Component | Parts by mass |
| --- | --- |
| Carbon black (I) | 5 |
| Synthetic calcium carbonate | 50 |
| Peroxide crosslinking agent DCP | 2.4 |
| Co-crosslinking agent (II) | 2 |

The parts by mass shown in Table 3 are parts by mass with respect to 100 parts by mass of the total amount of the rubber components.

The ratio B/A of the ethylene content A (=51.2 mass %) of the EPDM and the blending proportion B (=2.4 mass %) of the peroxide crosslinking agent with respect to the total amount of the rubber components was 0.047.

(Manufacture of Paper Feeding Roller)

Besides using the rubber composition described above, a paper feeding roller 1 of the same shape and same dimensions in the state with a shaft 3 fixed thereto was manufactured in the same manner as in Example 1.

Example 4

(Preparation of Rubber Composition)

As the rubber components, 60 parts by mass of the EPDM (I) and 80 parts by mass (EPDM amount as solids: 40 parts by mass) of the EPDM (III) were used.

The blending proportion of the EPDM in the total amount of the rubber components was 100 mass %. Also, the ethylene content A of the EPDM was 56.4 mass %.

The respective components shown in Table 4 below were further blended with the rubber components and a rubber composition was prepared by kneading using a 3 L kneader and an open roll.

TABLE 4

| Component | Parts by mass |
|---|---|
| Carbon black (II) | 90 |
| Heavy calcium carbonate | 45 |
| Peroxide crosslinking agent DCP | 3 |
| Co-crosslinking agent (I) | 1 |

The parts by mass shown in Table 4 are parts by mass with respect to 100 parts by mass of the total amount of the rubber components.

The ratio B/A of the ethylene content A (=56.4 mass %) of the EPDM and the blending proportion B (=3 mass %) of the peroxide crosslinking agent with respect to the total amount of the rubber components was 0.053.

(Manufacture of Paper Feeding Roller)

Besides using the rubber composition described above, a paper feeding roller 1 of the same shape and same dimensions in the state with a shaft 3 fixed thereto was manufactured in the same manner as in Example 1.

Example 5

(Preparation of Rubber Composition)

As the rubber components, 80 parts by mass of the EPDM (I) and 20 parts by mass of the EPDM (IV) were used.

The blending proportion of the EPDM in the total amount of the rubber components was 100 mass %. Also, the ethylene content A of the EPDM was 54 mass %.

The respective components shown in Table 5 below were further blended with the rubber components and a rubber composition was prepared by kneading using a 3 L kneader and an open roll.

TABLE 5

| Component | Parts by mass |
|---|---|
| Carbon black (I) | 5 |
| Synthetic calcium carbonate | 30 |
| Process oil | 1.5 |
| Peroxide crosslinking agent DCP | 3.5 |
| Co-crosslinking agent (II) | 1.5 |

The parts by mass shown in Table 5 are parts by mass with respect to 100 parts by mass of the total amount of the rubber components.

The ratio B/A of the ethylene content A (=54 mass %) of the EPDM and the blending proportion B (=3.5 mass %) of the peroxide crosslinking agent with respect to the total amount of the rubber components was 0.065.

(Manufacture of Paper Feeding Roller)

Besides using the rubber composition described above, a paper feeding roller 1 of the same shape and same dimensions in the state with a shaft 3 fixed thereto was manufactured in the same manner as in Example 1.

Example 6

(Preparation of Rubber Composition)

As the rubber components, 30 parts by mass of the EPDM (I), 10 parts by mass of the EPDM (II), and 60 parts by mass of the EPDM (IV) were used.

The blending proportion of the EPDM in the total amount of the rubber components was 100 mass %. Also, the ethylene content A of the EPDM was 62.6 mass %.

The respective components shown in Table 6 below were further blended with the rubber components and a rubber composition was prepared by kneading using a 3 L kneader and an open roll.

TABLE 6

| Component | Parts by mass |
|---|---|
| Carbon black (I) | 30 |
| Heavy calcium carbonate | 30 |
| Peroxide crosslinking agent DCP | 4 |
| Co-crosslinking agent (I) | 2 |

The parts by mass shown in Table 6 are parts by mass with respect to 100 parts by mass of the total amount of the rubber components.

The ratio B/A of the ethylene content A (=62.6 mass %) of the EPDM and the blending proportion B (=4 mass %) of the peroxide crosslinking agent with respect to the total amount of the rubber components was 0.064.

(Manufacture of Paper Feeding Roller)

Besides using the rubber composition described above, a paper feeding roller 1 of the same shape and same dimensions in the state with a shaft 3 fixed thereto was manufactured in the same manner as in Example 1.

Comparative Example 1

(Preparation of Rubber Composition)

As the rubber components, 30 parts by mass of the EPDM (I), 40 parts by mass of the IR, and 30 parts by mass of the SBR were used.

The blending proportion of the EPDM in the total amount of the rubber components was 30 mass %. Also, the ethylene content A of the EPDM was 50 mass %.

The respective components shown in Table 7 below were further blended with the rubber components and a rubber composition was prepared by kneading using a 3 L kneader and an open roll.

TABLE 7

| Component | Parts by mass |
|---|---|
| Carbon black (I) | 5 |
| Peroxide crosslinking agent DCP | 2.5 |

The parts by mass shown in Table 7 are parts by mass with respect to 100 parts by mass of the total amount of the rubber components.

The ratio B/A of the ethylene content A (=50 mass %) of the EPDM and the blending proportion B (=2.5 mass %) of the peroxide crosslinking agent with respect to the total amount of the rubber components was 0.050.

(Manufacture of Paper Feeding Roller)

Besides using the rubber composition described above, a paper feeding roller 1 of the same shape and same dimensions in the state with a shaft 3 fixed thereto was manufactured in the same manner as in Example 1.

Comparative Example 2

(Preparation of Rubber Composition)

As the rubber components, 50 parts by mass of the EPDM (IV), 30 parts by mass of the IR, and 20 parts by mass of the SBR were used.

The blending proportion of the EPDM in the total amount of the rubber components was 50 mass %. Also, the ethylene content A of the EPDM was 70 mass %

The respective components shown in Table 8 below were further blended with the rubber components and a rubber composition was prepared by kneading using a 3 L kneader and an open roll.

TABLE 8

| Component | Parts by mass |
|---|---|
| Carbon black (I) | 5 |
| Peroxide crosslinking agent DCP | 3 |

The parts by mass shown in Table 8 are parts by mass with respect to 100 parts by mass of the total amount of the rubber components.

The ratio B/A of the ethylene content A (=70 mass %) of the EPDM and the blending proportion B (=3 mass %) of the peroxide crosslinking agent with respect to the total amount of the rubber components was 0.043.

(Manufacture of Paper Feeding Roller)

Besides using the rubber composition described above, a paper feeding roller 1 of the same shape and same dimensions in the state with a shaft 3 fixed thereto was manufactured in the same manner as in Example 1.

Comparative Example 3

(Preparation of Rubber Composition)

As the rubber components, 20 parts by mass of the EPDM (I) and 80 parts by mass of the EPDM (IV) were used.

The blending proportion of the EPDM was 100 mass % of the total amount of the rubber components. Also, the ethylene content A of the EPDM was 66 mass %

The respective components shown in Table 9 below were further blended with the rubber components and a rubber composition was prepared by kneading using a 3 L kneader and an open roll.

TABLE 9

| Component | Parts by mass |
|---|---|
| Carbon black (I) | 30 |
| Heavy calcium carbonate | 30 |
| Peroxide crosslinking agent DCP | 2.8 |

The parts by mass shown in Table 9 are parts by mass with respect to 100 parts by mass of the total amount of the rubber components.

The ratio B/A of the ethylene content A (=66 mass %) of the EPDM and the blending proportion B (=2.8 mass %) of the peroxide crosslinking agent with respect to the total amount of the rubber components was 0.042.

(Manufacture of Paper Feeding Roller)

Besides using the rubber composition described above, a paper feeding roller 1 of the same shape and same dimensions in the state with a shaft 3 fixed thereto was manufactured in the same manner as in Example 1.

Comparative Example 4

(Preparation of Rubber Composition)

As the rubber components, 80 parts by mass of the EPDM (I) and 20 parts by mass of the EPDM (IV) were used.

The blending proportion of the EPDM in the total amount of the rubber components was 100 mass %. Also, the ethylene content A of the EPDM was 54 mass %.

The respective components shown in Table 10 below were further blended with the rubber components and a rubber composition was prepared by kneading using a 3 L kneader and an open roll.

TABLE 10

| Component | Parts by mass |
|---|---|
| Carbon black (I) | 5 |
| Synthetic calcium carbonate | 30 |
| Process oil | 5 |
| Peroxide crosslinking agent DCP | 1.8 |
| Co-crosslinking agent (I) | 1 |

The parts by mass shown in Table 10 are parts by mass with respect to 100 parts by mass of the total amount of the rubber components.

The ratio B/A of the ethylene content A (=66 mass %) of the EPDM and the blending proportion B (=2.8 mass %) of the peroxide crosslinking agent with respect to the total amount of the rubber components was 0.042.

(Manufacture of Paper Feeding Roller)

Besides using the rubber composition described above, a paper feeding roller 1 of the same shape and same dimensions in the state with a shaft 3 fixed thereto was manufactured in the same manner as in Example 1.

<Hardness>

The type A durometer hardness of each of the paper feeding rollers 1 manufactured in the respective examples and comparative examples were measured in accordance with the measurement method cited in the Japanese Industrial Standards JIS K6253-3:2006 "Rubber, vulcanized or thermoplastic—Determination of hardness—Part 3: Durometer method" under an environment of 23° C. temperature and 55% relative humidity.

With conveying rollers among paper feeding rollers, it is deemed favorable for the type A durometer hardness to be not less than 50 and not more than 85 as described above. Therefore, with the present examples and comparative examples, the measured hardness was evaluated as satisfactory (∘) if it was within this range and evaluated as unsatisfactory (x) otherwise.

<Friction Coefficient μ>

On a sheet of paper [Xerox Business 4200 manufactured by Xerox Corporation] of 60 mm width×210 mm length placed on a Teflon (registered trademark) plate, each of the paper feeding rollers manufactured in the respective examples and comparative examples was press contacted from above while applying a vertical load of 200 gf under an environment of 23° C. temperature and 55% relative humidity, a conveying force F applied to the paper when the paper feeding roller in this state was rotated at a rotational speed of 120 rpm was measured using a load cell, and the friction coefficient μ was determined using formula (4):

$$\mu = F/200 \tag{4}$$

With conveying rollers among paper feeding rollers, it is deemed favorable for the friction coefficient μ to be not less than 0.7. Therefore, with the present examples and comparative examples, the measured friction coefficient μ was evaluated as satisfactory (○) if it was not less than 0.7 and evaluated as unsatisfactory (×) if it was less than 0.7.

<Wear Rate>

Each of the paper feeding rollers 1 manufactured in the respective examples and comparative examples was set in the rotational friction coefficient apparatus described above under an environment of 23° C. temperature and 55% relative humidity and was rotated continuously for 10 minutes at conditions of 500 g load and 200 rpm rotational speed with the friction object being Xerox (registered trademark) P paper. An abrasion loss (g) was determined from an initial mass (g) before the continuous rotation and a wear rate (%) was determined by formula (c):

$$\text{Wear rate (\%)} = (\text{Abrasion loss})/(\text{initial mass}) \times 100 \tag{c}$$

A wear rate of not more than 0.2% was evaluated as satisfactory (○) and that exceeding 0.2% was evaluated as unsatisfactory (×).

<Recess Amount>

The recess test described above was performed to determine the recess amounts (mm) of the paper feeding rollers 1. As the model of a counter roller, the shaft 5 was set to have an outer diameter φ6 mm. Also, the load F was set to 600 g per single paper feeding roller.

A recess amount of not more than 0.1 mm was evaluated as satisfactory (○) and that exceeding 0.1 mm was evaluated as unsatisfactory (×).

The results of the above are shown in Table 11 and Table 12.

TABLE 11

|  |  |  | Example 1 | Example 2 | Example 3 | Example 4 | Example 5 | Example 6 |
|---|---|---|---|---|---|---|---|---|
| Rubber composition | EPDM (mass %) |  | 50 | 70 | 100 | 100 | 100 | 100 |
|  | Ethylene content A (mass %) |  | 50 | 58.57 | 51.2 | 56.4 | 54 | 62.6 |
|  | Peroxide crosslinking agent B (mass %) |  | 3 | 2.7 | 2.4 | 3 | 3.5 | 4 |
|  | Ratio B/A |  | 0.060 | 0.046 | 0.047 | 0.053 | 0.065 | 0.064 |
| Test results | Hardness | Measured value | 55 | 64 | 55 | 65 | 62 | 76 |
|  |  | Evaluation | ○ | ○ | ○ | ○ | ○ | ○ |
|  | Friction coefficient μ | Measured value | 1.5 | 1.4 | 1.3 | 0.9 | 1.2 | 1.1 |
|  |  | Evaluation | ○ | ○ | ○ | ○ | ○ | ○ |
|  | Wear rate (%) | Measured value | 0.17 | 0.13 | 0.16 | 0.09 | 0.11 | 0.08 |
|  |  | Evaluation | ○ | ○ | ○ | ○ | ○ | ○ |
|  | Recess amount (mm) | Measured value | 0.05 | 0.08 | 0.04 | 0.09 | 0.06 | 0.07 |
|  |  | Evaluation | ○ | ○ | ○ | ○ | ○ | ○ |

TABLE 12

|  |  |  | Comparison Example 1 | Comparison Example 2 | Comparison Example 3 | Comparison Example 4 |
|---|---|---|---|---|---|---|
| Rubber composition | EPDM (mass %) |  | 30 | 50 | 100 | 100 |
|  | Ethylene content A (mass %) |  | 50 | 70 | 66 | 54 |
|  | Peroxide crosslinking agent B (mass %) |  | 2.5 | 3 | 2.8 | 1.8 |
|  | Ratio B/A |  | 0.050 | 0.043 | 0.042 | 0.033 |
| Test results | Hardness | Measured value | 52 | 67 | 78 | 53 |
|  |  | Evaluation | ○ | ○ | ○ | ○ |
|  | Friction coefficient μ | Measured value | 1.7 | 1.3 | 1.0 | 1.4 |
|  |  | Evaluation | ○ | ○ | ○ | ○ |
|  | Wear rate (%) | Measured value | 0.25 | 0.06 | 0.05 | 0.09 |
|  |  | Evaluation | × | ○ | ○ | ○ |
|  | Recess amount (mm) | Measured value | 0.06 | 0.31 | 0.18 | 0.21 |
|  |  | Evaluation | ○ | × | × | × |

From the results for Comparative Example 1 in Table 12, it was found that if the blending proportion of the EPDM is less than 50 mass % of the total amount of the rubber components, the paper feeding roller cannot be imparted with a satisfactory wear resistance. Also, from the results for Comparative Examples 2 and 3, it was found that if the ratio B/A of the ethylene content A of the EPDM and the blending proportion B of the peroxide crosslinking agent with respect to the total amount of the rubber components is less than 0.046, the recess amount exceeds 0.1 mm and a recess due to deformation tends to form when a state of being in contact with another roller at a single location continues for a comparatively long period.

On the other hand, from the results for Examples 1 to 6 in Table 11, it was found that by setting the blending proportion of the EPDM to not less than 50 mass % of the total amount of the rubber components and setting the ratio B/A to not less than 0.046, the paper feeding roller can be made to be not more than 0.1 mm in recess amount while being imparted with a satisfactory wear resistance and thereby made unlikely for a recess due to deformation to form even when a state of being in contact with another roller at a single location continues for a comparatively long period.

Also, from the results for Examples 1 and 2 and Examples 3 to 6, it was found that, though depending on the blending proportion of the peroxide crosslinking agent, the wear resistance of the paper feeding roller can be improved further by using just two or more types of EPDM that differ in ethylene content as the rubber components.

Example 7

As the rubber components, 20 parts by mass of the EPDM (I) and 160 parts by mass (EPDM amount as solids: 80 parts by mass) of the EPDM (III) were used.

The blending proportion of the EPDM in the total amount of the rubber components was 100 mass %. Also, the blending proportion of the EPDM (I) as the low-ethylene EPDM was 20 mass % of the total amount of the EPDM.

The respective components shown in Table 13 below were further blended with the rubber components and a rubber composition was prepared by kneading using a 3 L kneader and an open roll.

TABLE 13

| Component | Parts by mass |
| --- | --- |
| Carbon black (II) | 130 |
| Heavy calcium carbonate | 65 |
| High dispersing sulfur | 1 |
| Accelerator BZ | 2 |
| Accelerator CZ | 2 |
| Accelerator TET | 1 |
| Zinc oxide | 5 |
| Stearic acid | 1 |

The parts by mass shown in Table 13 are parts by mass with respect to 100 parts by mass of the total amount of the rubber components.

The blending proportion of the high dispersing sulfur was 1 part by mass with respect to 100 parts by mass of the total amount of the rubber components. Also, the blending proportion of the filler was 195 parts by mass with respect to 100 parts by mass of the total amount of the rubber components.

(Manufacture of Paper Feeding Roller)

Besides using the rubber composition described above, a paper feeding roller 1 of the same shape and same dimensions in the state with a shaft 3 fixed thereto was manufactured in the same manner as in Example 1.

The respective tests described above were performed on the paper feeding roller manufactured in Example 7 to evaluate its characteristics. The results are shown together with results for Example 1 in Table 14.

TABLE 14

| | | | Example 1 | Example 7 |
| --- | --- | --- | --- | --- |
| Test results | Hardness | Measured value | 55 | 70 |
| | | Evaluation | ○ | ○ |
| | Friction coefficient μ | Measured value | 1.5 | 1.0 |
| | | Evaluation | ○ | ○ |
| | Wear rate (%) | Measured value | 0.17 | 0.10 |
| | | Evaluation | ○ | ○ |
| | Recess amount (mm) | Measured value | 0.05 | 0.08 |
| | | Evaluation | ○ | ○ |

From the results for Examples 1 and 7 in Table 14, it was found that, with a system of crosslinking EPDM as the rubber components by a sulfur-based crosslinking agent, such as sulfur, etc., by setting the blending proportion of the sulfur-based crosslinking agent to not less than 0.3 parts by mass and not more than 2 parts by mass with respect 100 parts by mass of the total amount of EPDM, the paper feeding roller can be made, as in Example 1, to be not more than 0.1 mm in recess amount while being imparted with a satisfactory wear resistance and thereby made unlikely for a recess due to deformation to form even when a state of being in contact with another roller at a single location continues for a comparatively long period.

DESCRIPTION OF SYMBOLS

1 Paper feeding roller
2 Through hole
3 Shaft
4 Outer peripheral surface
5 Shaft
6 Straight line
7 Outer peripheral surface
F Load
L1 Distance
L2 Distance

What is claimed is:

1. A paper feeding roller formed of a rubber composition such that the paper feeding roller has a tubular shape having a through hole through which a shaft is inserted, wherein
(A) the shaft is inserted through and fixed in the through hole and after leaving still for 24 hours in a state where another shaft of φ6 mm outer diameter is press-contacted against a single location of an outer peripheral surface by applying a load of 600 g and under a high temperature environment of 60° C. and then leaving still for 8 hours at room temperature while maintaining the press-contacted state, a recess amount, determined from a thickness $T_1$ (mm) at a position at which the shaft was press-contacted and a thickness $T_0$ (mm) at a position at which the shaft was not press-contacted and using formula (1):

$$\text{Recess amount} = T_0 - T_1 \qquad (1)$$

is not more than 0.1 mm,
(B) the rubber composition includes rubber components constituted of just one type or two or more types of low-ethylene propylene diene rubber with an ethylene content of not more than 55 mass % and one type or two or more types of high-ethylene propylene diene rubber with an ethylene content exceeding 55 mass %, and
(C) the blending proportion in the rubber composition of the high-ethylene propylene diene rubber and the low-ethylene propylene diene rubber as expressed as the blending proportion of the low-ethylene propylene diene rubber in the total amount of the rubber components is 30 mass % to 80 mass %.

2. The paper feeding roller according to claim 1, wherein the rubber composition includes a peroxide crosslinking agent with a function of crosslinking the rubber components, and
a ratio B/A of an ethylene content A (mass %) of the ethylene propylene diene rubber and a blending proportion B (mass %) of the peroxide crosslinking agent with respect to the total amount of the rubber components is not less than 0.046.

3. The paper feeding roller according to claim 2, wherein the blending proportion B of the peroxide crosslinking agent with respect to the total amount of the rubber components is not more than 5 mass %.

4. The paper feeding roller according to claim 1, wherein a type A durometer hardness of the paper feeding roller is not less than 50 and not more than 85.

5. The paper feeding roller according to claim 1, that is a conveying roller.

6. The paper feeding roller according to claim 1, that is used in a state of being contacted with a counter roller.

* * * * *